(12) United States Patent
Matsumoto

(10) Patent No.: US 6,229,743 B1
(45) Date of Patent: May 8, 2001

(54) METHOD OF A REASSIGN BLOCK PROCESSING TIME DETERMINATION TEST FOR STORAGE DEVICE

(75) Inventor: Noboru Matsumoto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/528,717

(22) Filed: Mar. 20, 2000

(30) Foreign Application Priority Data

Feb. 9, 1999 (JP) .................................................. 11-248431

(51) Int. Cl.$^7$ .............................. G11C 13/00; G11C 7/00
(52) U.S. Cl. .................. 365/201; 365/63; 365/189.01; 365/230.01; 365/238.5
(58) Field of Search .................. 365/63, 189.01, 365/230.01, 201, 238.5

(56) References Cited

U.S. PATENT DOCUMENTS 5,557,573 * 9/1996 McClure ............................. 365/201

FOREIGN PATENT DOCUMENTS 8-305502   11/1996 (JP) .

* cited by examiner

*Primary Examiner*—Terrell W. Fears
(74) *Attorney, Agent, or Firm*—Staas & Halsey LLP

(57) ABSTRACT

According to a method of a reassign block processing time determination test of the present invention, for a hard disk drive being tested, reassign block processing is performed for a data block corresponding to a designated logical block address, and the time required for that reassign block processing is computed. When the reassign block processing time exceeds a prescribed time, the reassign block processing time is determined to be abnormal. It therefore becomes possible to detect a hard disk drive wherein the reassign block processing time exceeds the time allowed by a RAID system before configuring the RAID system, and thus to avoid fatal problems in operating the RAID system before they occur.

15 Claims, 6 Drawing Sheets

METHOD OF A REASSIGN BLOCK PROCESSING TIME DETERMINATION TEST FOR STORAGE DEVICE

BACKGROUND OF THE INVENTION

1. Field of the Invention

The present invention relates to a method of a performance determination test for storage devices, and particularly to a method of a reassign block processing time determination test for hard disk drives that are magnetic storage devices.

2. Description of the Related Art

The recording area in a hard disk (magnetic disk) drive used as a storage device in a computer system is divided into a plurality of blocks defined by logical block addresses (LBAs). Hard disk drives also have available area where data are recorded instead of in blocks where defects have occurred. The available area is configured of a plurality of reassign blocks, with one reassign block being assigned to one defective sector. The hard disk drive, when it has judged that a defect has developed in a block corresponding to a given LBA, executes reassign block processing to assign a prescribed reassign block to the given LBA in place of the defective block, and to record data corresponding to the given LBA in the assigned reassign block.

Conventionally, performance determination tests for hard disk drives have been tests that judge whether or not the reassign block processing can be executed normally. In recent years, however, hard disk drives are increasingly being used in so-called RAID (redundant arrays of inexpensive disks) environments. In such cases, the time required for the reassign block processing can cause problems.

FIG. 7 is a model diagram of a computer system running in a RAID environment. In FIG. 7, a plurality of hard disk drives (HDDS) 10 are connected in parallel to a RAID card 11. A server 12 connected to the RAID card 11 can simultaneously access the plurality of hard disk drives 10 through the RAID card 11.

In this case, if the time required for data recording in a prescribed hard disk drive according to a write command sent from the server 12 to the prescribed hard disk drive 10 exceeds a prescribed time, the RAID card 11 recognizes an error (time out error). More specifically, when there is no defect in the LBA for the hard disk drive wherein the data are recorded, data are normally recorded within that prescribed time. When there is a defect in the LBA, however, the abovedescribed reassign block processing is executed, and the time for that reassign block processing sometimes exceeds the prescribed time. In other words, hard disk drives wherein the reassign block processing time exceeds the prescribed time cannot be used in the RAID environment.

Thus, although the reassign block processing time in a hard disk drive is a critical factor in judging the performance of the hard disk drive, performance determination tests have not conventionally been conducted to determine reassign block processing times.

SUMMARY OF THE INVENTION

Accordingly, an object of the present invention is to provide a method of a reassign block processing time determination test for a hard disk drive.

In order to attain the object stated above, according to the method of the reassign block processing time determination test of the present invention, for a hard disk drive being tested, reassign block processing is performed for a data block corresponding to a designated logical block address, and the time required for that reassign block processing is computed. When the reassign block processing time exceeds a prescribed time, the reassign block processing time is determined to be abnormal. It therefore becomes possible to detect a hard disk drive wherein the reassign block processing time exceeds the time allowed by a RAID system before configuring the RAID system, and thus to avoid fatal problems in operating the RAID system before they occur.

What is characteristic of the method of the reassign block processing time determination test of the present invention for attaining the object stated earlier, for a storage device containing data area and available area, is that it comprises the steps of: acquiring the time for reassign block processing data recorded in a data block in a data area corresponding to a designated logical block address in the available area; and comparing the acquired reassign block processing time with a prescribed time.

DESCRIPTION OF THE PREFERRED EMBODIMENTS

An embodiment aspect of the present invention is now described. However, the technical scope of the present invention is not limited to or by the embodiment aspect.

Figure 1:
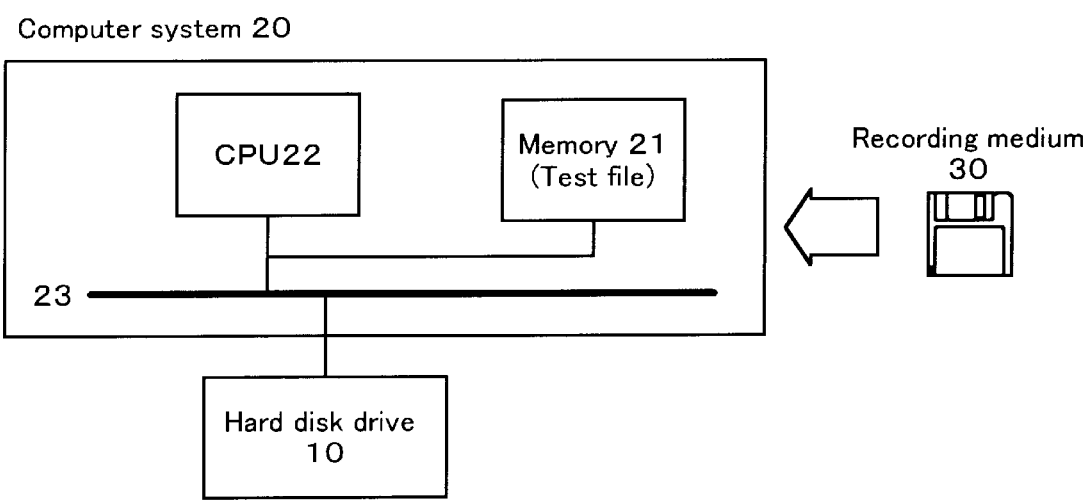
FIG. 1 is a diagram of a system for executing a reassign block processing time determination test in an embodiment aspect of the present invention.

FIG. 1 is a diagram of a system for executing a method of a reassign block processing time determination test of the present invention. In FIG. 1, the hard disk drive 10 that is being tested is connected over a data bus 23 to a computer system 20 that is an upper system. The method of the reassign block processing time determination test in the embodiment aspect of the present invention described below is provided as a test file that is a program recorded on a recording medium 30. The recording medium 30 may be a floppy disk or CD-ROM or the like, for example. The recording medium 30 may also be a storage device built into the computer system 20. The test file recorded on the recording medium 30 is read by the computer system 20 and deployed in a memory (RAM) 21. The reassign block processing time determination test is performed on the hard disk drive 10 when a CPU 22 executes the test file.

The hard disk drive 10 comprises at least one magnetic disk, preferably with data area provided on the front and back sides of each disk. Each side of each disk is physically divided into a plurality of data blocks (hereinafter called simply "blocks"). Each block, for example, is defined by a physical address comprising a disk identifying code, disk side identifying code, and a serial number on each side. Each block is also defined by a logical address (logical block address=LBA) designated by a command. The logical block addresses (LBAS) may be given, for example, as serial numbers for all blocks in the recording area of the hard disk drive. However, when a defective block is subjected to reassign block processing, the LBA that originally defined that defective block defines the reassign block assigned by reassign block processing.

Figure 2:
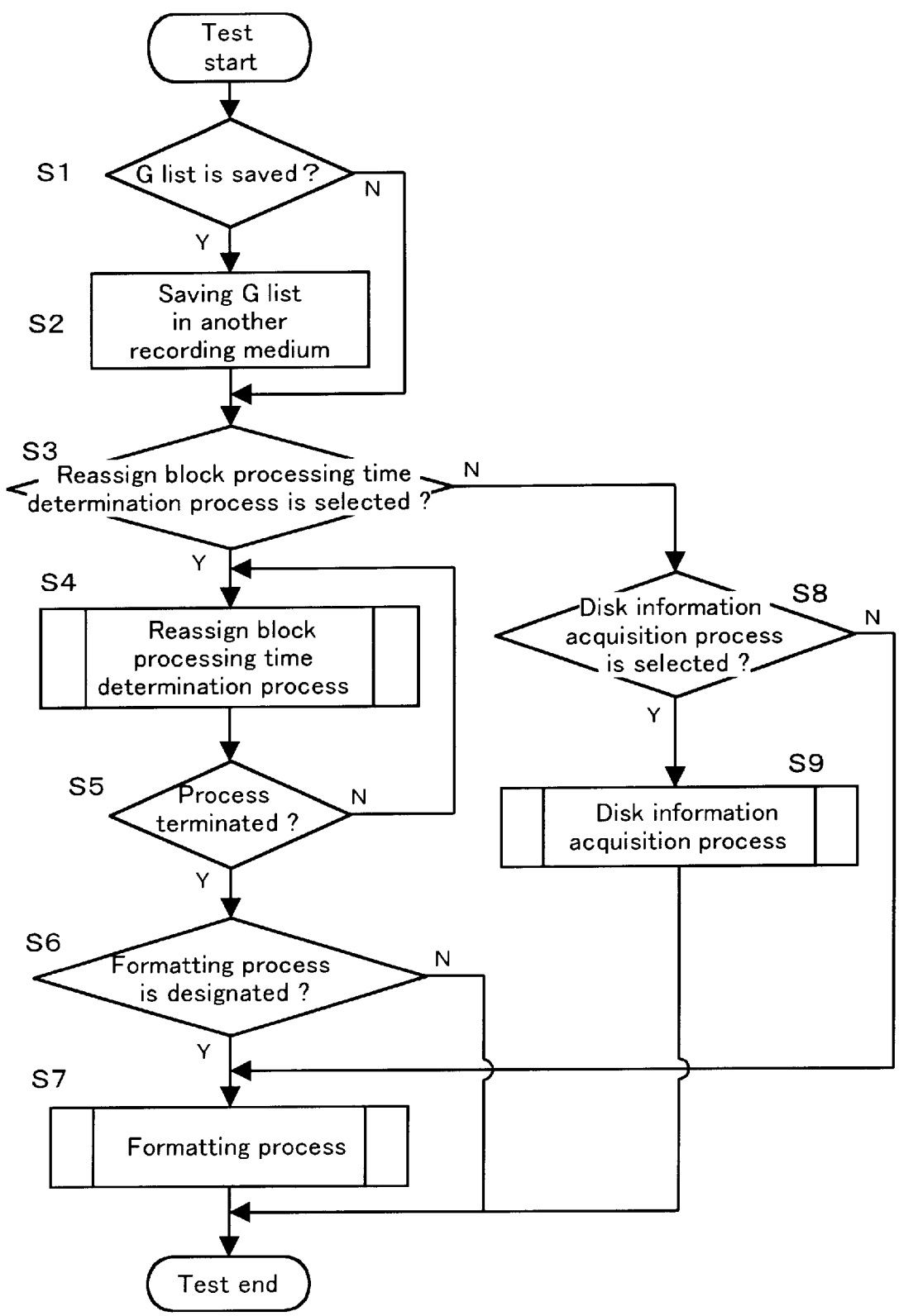
FIG. 2 is an overall processing flowchart for a method of a reassign block processing time determination test in an embodiment aspect of the present invention.

FIG. 2 is an overall processing flowchart for hard disk drive reassign block processing time determination test in this embodiment aspect of the present invention. Firstly, in step S1, the presence or absence of a G list is verified.

The hard disk drive stores the physical addresses of defect-containing blocks present on that disk both in a P (primary) list and in a G (grown) list. The P list is a list of the physical addresses of blocks containing defects that developed prior to shipping the hard disk drive, that is, in the manufacturing stage. The G list, on the other hand, is a list of the physical addresses of blocks containing defects that developed after the hard disk drive is shipped, that is, during use. Accordingly, the P list does not change, but the G list is updated every time a new defect develops.

As will be described subsequently, when the reassign block processing time determination test in this embodiment aspect of the present invention is executed, formatting is performed automatically after the reassign block processing time determination process is performed. During that formatting, if a G list has been saved, that G list can be used to again perform reassign block processing on a block containing a defect.

When saving a G list is designated, the G list stored in the hard disk drive is copied to another recording medium (such as a floppy disk) and saved (step S2). That other recording medium may be a prescribed area on the recording medium (floppy disk or the like) on which a program for the method of the reassign block processing time determination test in this embodiment aspect is recorded.

Next, in step S3, a determination is made as to whether or not reassign block processing time determination process has been selected. When reassign block processing time determination process has been selected, the reassign block processing time determination process in the embodiment aspect of the present invention diagrammed in FIG. 3 and FIG. 4 is executed in step S4.

Figure 5:
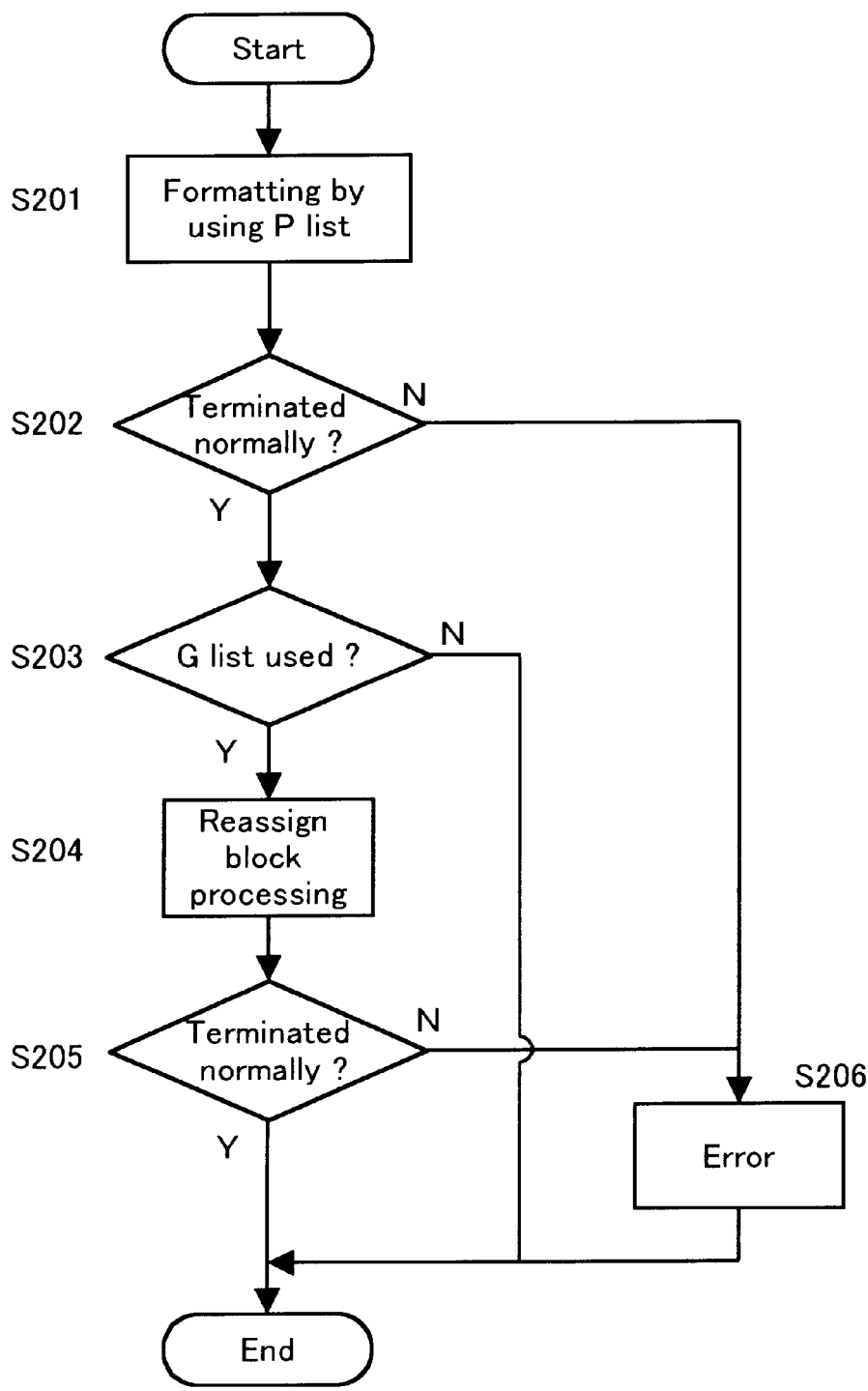
FIG. 5 is a flowchart for format processing in an embodiment of the present invention.
Figure 6:
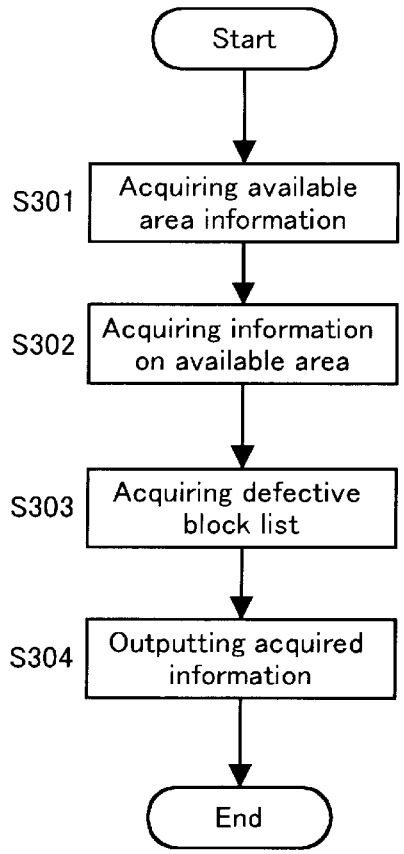
FIG. 6 is a flowchart for disk information acquisition process in embodiment aspect of the present invention.
Figure 7:
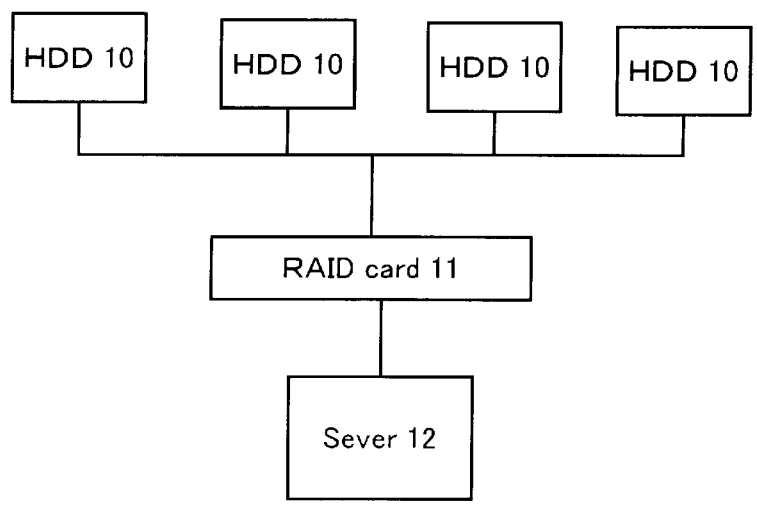
FIG. 7 is a model diagram of a computer system running in a RAID environment.

If reassign block processing time determination process is not selected in step S3, on the other hand, a determination is made, in step S8, as to whether or not disk information acquisition process has been selected. If disk information acquisition process has been selected, the disk information acquisition process in the embodiment aspect of the present invention diagrammed in FIG. 6 is executed in step S9. If in step S8 disk information acquisition process has not been selected, on the other hand, the formatting process in the embodiment aspect of the present invention diagrammed in FIG. 5 is executed in step S7. That is, in the method of the reassign block processing time determination test in this embodiment aspect, it is possible to execute only the formatting process without performing either reassign block processing time determination process or disk information acquisition process. The reassign block processing time determination process is now described in detail.

Figure 3:
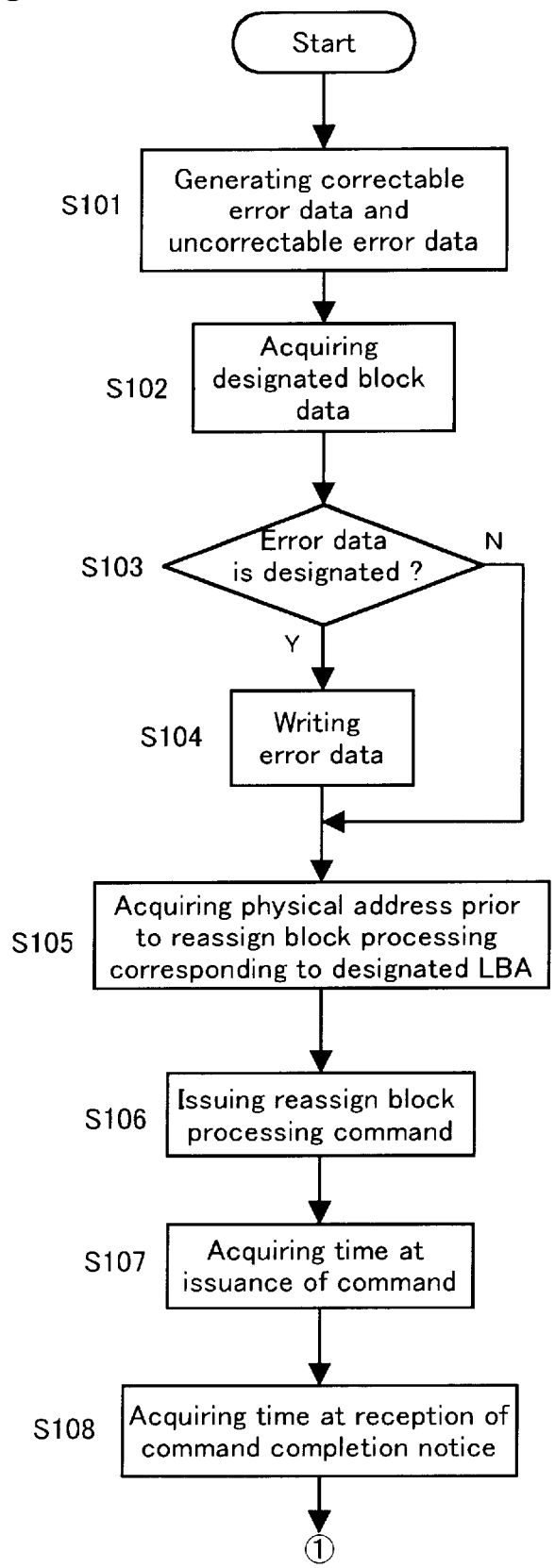
FIG. 3 is a flowchart (No.1) of reassign block processing time determination process in an embodiment aspect of the present invention.
Figure 4:
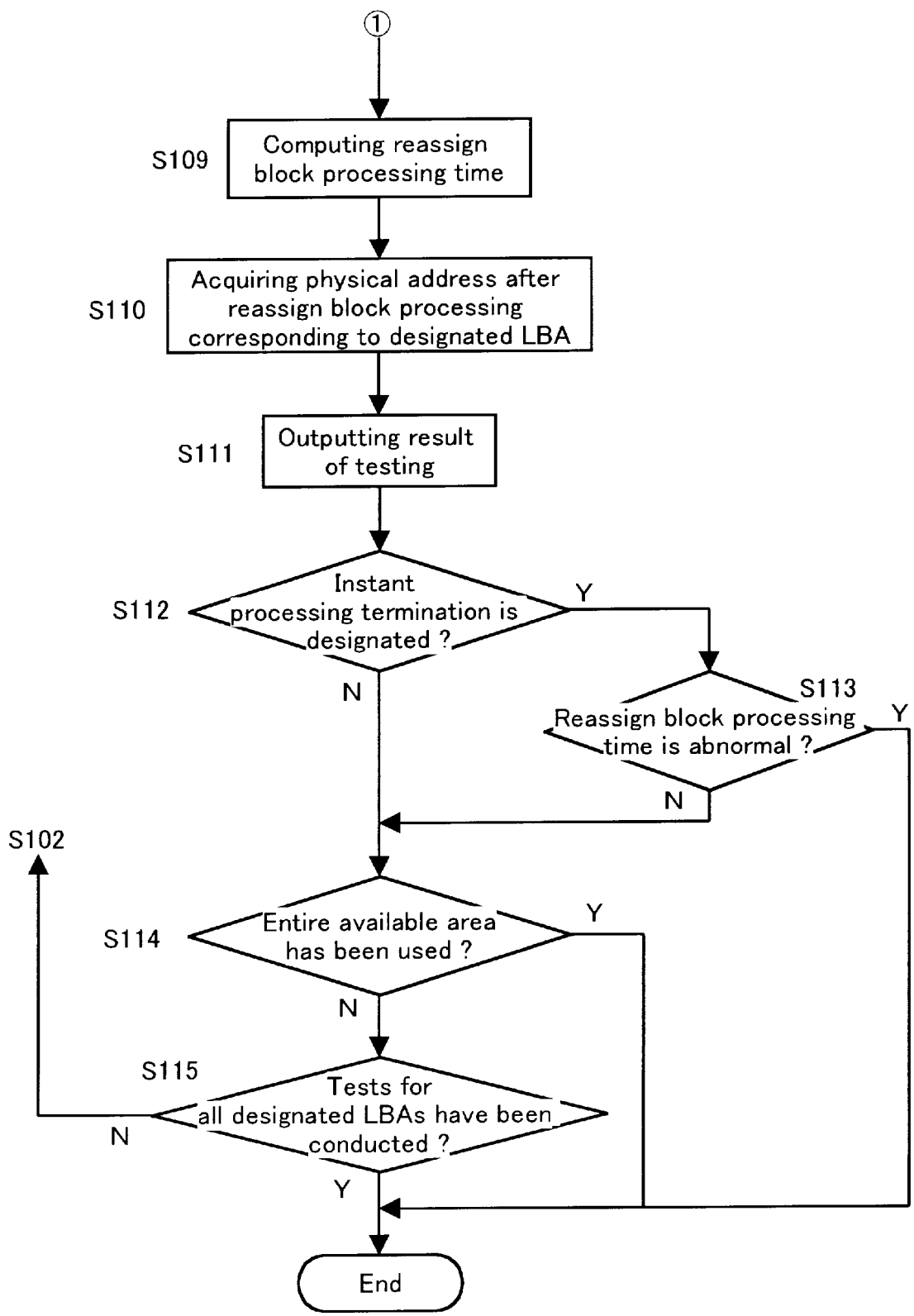
FIG. 4 is a flowchart (No.2) of reassign block processing time determination process in an embodiment aspect of the present invention.

FIG. 3 and FIG. 4 are flowcharts for reassign block processing time determination process in an embodiment aspect of the present invention. First, in step S101 in FIG. 3, any data (including ECC (error correction code) portion) already written to the hard disk drive are acquired as sample data, and, by reversing the bits in those sample data, correctable error data and uncorrectable error data are generated.

Correctable error data are data that can be corrected by ECC. Uncorrectable data are data that cannot be corrected by ECC.

Next, in step S102, designated block data in the test file are acquired. The designated block data include the logical block address (LBA) for at least one block and the type of data written to that block. The type of data designated will be either uncorrectable error data, correctable error data, or errorless data.

Then, in step S103, a determination is made as to whether the data type designated by the designated block data acquired is error data (either correctable error data or uncorrectable error data) or errorless data. When those data are error data, then the error data designated out of those error data newly generated in step S101, described above, are written to a block corresponding to the designated logical block address (step S104). If they are errorless data, however, then the data already written to the block corresponding to the designated logical block address are used as is.

Normally, during reassign block processing execution, when a defect exists in the data, the hard disk drive attempts to correct the data using the ECC. Accordingly, differences in correction time develop depending on whether the data correction attempt succeeds or fails, and on the number of data correction retries. These differences cause differences to also develop in the reassign block processing time. Accordingly, in reassign block processing time determination process, by making it possible to select data types, it becomes possible to specify the types of data that causes delay in reassign block processing time attributable to error data correction time (exceeding prescribed time and, in the data correction processing, also to specify the number of retries causing delay in reassign block processing time.

Next, in step S105, the physical address corresponding to the designated logical block address, that is, the physical address of the block prior to reassign block processing, is acquired.

Then, in step S106, a reassign block processing command is issued by the upper system to that designated logical block address. The upper system acquires the time at the issuance of that command using a clock function of the upper system (step S107). The hard disk drive, upon receipt of the reassign block processing command, assigns the reassign block in the available area to the designated LBA, and reassign block processing is performed that records data there. When the reassign block processing is complete, a command completion notice is sent to the upper system. The upper system acquires the time at the reception of the command completion notice (step S108).

Moving to FIG. 4, in step S109, the reassign block processing time is computed. The reassign block processing time is found from the difference between the command completion notice receipt time and the command issuance time. Then, if the reassign block processing time exceeds a preset prescribed time such as the time-out time of a RAID card, it is judged that an abnormality has occurred, whereas, if that time is within the prescribed time, the situation is judged to be normal. In step S110, the physical address after reassign block processing corresponding to the designated LBA, that is, the physical address of the assigned reassign block, is acquired. In step S111, the test results are output. The test results are displayed on the monitor of the upper system or printed out, for example. The test results include such items as (1) the designated logical block address, (2) the physical address prior to reassign block processing corresponding thereto, (3) the physical address after reassign block processing corresponding thereto, (4) the era data type, (5) the computed reassign block processing time, (6) a normal/abnormal judgment therefor, and (7) the test order in the test file. The test results are also recorded on the other recording medium.

In the test results described in the foregoing, the physical addresses both before and after reassign block processing are output. The reassign block processing time is dependent on the physical relationship between the defective block and the reassign block, that is, on the time required by the seek operation from the defective block to the reassign block. Therefore the output physical addresses for the defective block and the reassign block aid in the analysis of whether or not the abnormality (delay) in reassign block processing time is caused by the seek operation time.

In step S112, a determination is made as to whether or not there is an instant processing termination designation when an abnormality is judged. If there is such a designation, when an abnormality is judged in the reassign block processing time in a unit test (processing routines from step S102 to S111) for some single LBA (step S113), in that unit test, the reassign block processing time determination process is instantly terminated, and unit tests are not conducted for subsequent LBAs.

When there is no such designation in step S112, or when normality is judged in step S113, a determination is made in step S114 as to whether or not the entire available area has been used. When all of the reassign blocks in the available area have been assigned, there are no more reassign blocks to assign to designated LBAs, wherefore unit tests cannot be continued beyond that point and the reassign block processing time determination process terminates.

When unused area remains in the available area, in step S115, a judgment is made as to whether or not unit tests have been conducted for all LBAs designated in the test file. If unprocessed LBAs remain, step S102 is returned to, the next designated block data designated in the test file are acquired, and the processing routines from step S102, described above, are repeated. If unit tests have been performed for all designated LBAs, the reassign block processing time determination process is terminated.

In other words, the reassign block processing time determination process will terminate whenever unit tests have been completed for all designated LBAs, or when a condition is reached where all available area has been used, or when an instant termination designation has been made and abnormality has been judged.

Thus, by terminating the reassign block processing time determination process when the designated number of unit tests have been performed, or when all of the available area has been used by a plural number of unit tests, all of the reassign blocks can be used without being aware of the size of the available area (i.e. the maximum number of reassign blocks).

Furthermore, when all of the available area has been used, the hard disk drive sends a notice to that effect to the upper system. In the reassign block processing time determination process in this embodiment aspect, verification can also be made as to whether or not that notification was issued normally.

In the reassign block processing time determination process, moreover, by designating a plurality of LBAs to the designated block data, the unit tests are repeated automatically for the plurality of LBAS, without having to designate an LBA for each unit test. Thereby the test time is shortened, and also, because data entry errors and other operator errors can be suppressed, the efficiency of the job for test is enhanced.

The designated block data in the test file can be produced as desired. That is, it is possible to designate the LBAS to be tested, at will. Thus it is possible to produce test files which are compatible with the characteristics of the hard disk drive.

Returning to FIG. 2, in step S5, when the reassign block processing time determination process finishes, a judgment is made in step S6 as to whether or not the formatting process has been designated for execution. If there is an execution designation, the formatting process diagrammed in FIG. 5 is executed; if there is no such designation, reassign block processing time determination process terminates.

Thus the reassign block processing time can be judged for a hard disk drive by the reassign block processing time determination process. Accordingly, hard disk drives for which the reassign block processing time exceeds the time allowed by a RAID system can be detected before building the RAID system, and fatal problems can be prevented before they occur in the operation of a RAID system. Also, when no abnormality in the reassign block processing time is determined by the reassign block processing time determination process in this embodiment aspect, in a condition wherein all of the available area has been used, it can be determined that the tested hard disk drive can be employed in the RAID system.

FIG. 5 is a flowchart for formatting processing in an embodiment aspect of the present invention. In step S201, the hard disk drive is first formatted using only the P list. That is, for the physical addresses noted in the P list, reassign block processing is performed simultaneously with the formatting. When the formatting process terminates normally (step S202), a decision is made as to whether or not to use the G list (step S203). In step S2 in FIG. 2, when a G list has been saved, reassign block processing can also be performed for physical addresses noted in the G list (step S204). When the reassign block processing for the G list terminates normally (step S205), the formatting process terminates. In steps S202 and S205, in the case of abnormal termination, error processing is done in step S206 and the formatting process terminates. Thus, in this embodiment aspect of the present invention, formatting is done automatically after reassign block processing time determination process. Accordingly, a hard disk drive wherein data content has been modified by reassign block processing time determination process can be easily restored without performing tedious operations.

FIG. 6 is a flowchart for disk information acquisition process in an embodiment aspect of the present invention. In step S301, available area information is first acquired. This available area information includes such information as available area distribution and the number of reassign blocks. The available area distribution is position information for the available area designated on at least one disk in the hard disk drive. When available area is established on only one of a plurality of disks, for example, the available area distribution information is set for each disk. Cases are supposed wherein this is set for each of a prescribed number of blocks. The number of reassign blocks is information relating to the length of the available area data, that is, to the size of the available area. The acquisition of the available area information aids in the analysis of abnormalities in the reassign block processing time caused by the physical arrangement of the available area.

Next, in step S302, information on available area in the hard disk drive is acquired. The available area information is, for example, a maximum number of LBAs which can be utilized. The acquisition of the maximum LBAs aids determination of LBA to be designated in the designated block data in the test file.

Further, in step S303, the P list and G list which are defective block lists are acquired. In step S304, the information acquired in steps S301, S302, and S303, described above, is output, and disk information acquisition process terminates. The information acquired as described in the foregoing is pre-recorded in a prescribed area on a disk in the hard disk drive. That prescribed area is an area wherein data are not erased by formatting.

Thus, by making it possible to select to save the G list and to select reassign block processing based on the G list in formatting processing, the hard disk drive tested can be restored in a condition wherein the G list does not exist (case where G list is not saved), or in a condition equivalent to that prior to the start of test (case where G list is saved but reassign block processing based on the G list is not performed), or in a condition wherein the hard disk drive can be used normally (case where reassign block processing based on the G list is performed).

By applying this embodiment aspect, moreover, a special environment is realized, namely that of a hard disk drive wherein all of the available area is used, wherefore utilization is possible for tests other than the reassign block processing time determination test described in the foregoing.

The storage devices to which the method of the reassign block processing time determination test of this embodiment aspect of the present invention can be applied are not limited to hard disk drives, but can also be applied to storage devices that read and write data using another recording medium such as a magnetic-optical disk (MO), for example.

The following modes are also possible for the method of the reassign block processing time determination test of the present invention. The reassign block processing time determination test terminates when all reassign blocks in the available area have been used prior to completion of reassign block processing on a data block corresponding to a designated logical block address.

The information relating to the storage device includes the distribution of the available area in the storage device, the number of reassign blocks, and the number of logical block addresses.

In addition, the following modes are possible for the recording medium on which is stored the program for implementing the method of the reassign block processing time determination test of the present invention.

The program stored on the recording medium comprises a step for designating a plurality of logical block addresses, and reassign block processing is performed sequentially on the data blocks corresponding respectively to the designated plurality of logical block addresses.

The program stored on the recording medium terminates the reassign block processing time determination test when all reassign blocks in the available area have been used prior to completion of reassign block processing on a data block corresponding to a designated logical block address.

The program stored on the recording medium comprises a step for recording to a data block wherewith it is possible to select either errorless data, correctable error data, or uncorrectable error data.

The program stored on the recording medium comprises a step for acquiring, for a prescribed logical block address, the physical address of the data block prior to reassign block processing and the physical address of the reassign block after reassign block processing.

The program stored on the recording medium comprises a step for formatting the recording medium after completion of the reassign block processing time determination test.

The program stored on the recording medium comprises a step for acquiring information relating to the storage device noted earlier.

By means of the reassign block processing time determination test according to the present invention, as described in the foregoing, reassign block processing is performed on data blocks corresponding to designated logical addresses, for a hard disk drive being tested, and the time of that reassign block processing is computed. When the reassign block processing time exceeds the prescribed time, the reassign block processing time is judged to be abnormal. Accordingly, hard disk drives wherein the reassign block processing time exceeds the time allowed by a RAID system can be detected before configuring the RAID system, and it is thus possible to avoid fatal problems in the RAID system operation before they occur.

The protected scope of the present invention is not limited to or by the embodiment aspect described in the foregoing, but extends to the inventions cited in the claims and to anything equivalent thereto.

What is claimed is:

1. A method of a reassign block processing time determination test for storage devices containing data area and available area, comprising the steps of:
    acquiring time for reassign block processing data recorded in a data block in said data area corresponding to a designated logical block address to a reassign block in said available area; and
    comparing said acquired reassign block processing time with a prescribed time.

2. The method according to claim 1, comprising the step of designating a plurality of logical block addresses,
    wherein reassign block processing is sequentially performed on said data blocks corresponding respectively to said designated plurality of logical block addresses.

3. The method according to claim 1, wherein the reassign block processing time determination test terminates when all reassign blocks in the available area have been used prior to completion of reassign block processing on a data block corresponding to a designated logical block address.

4. The method according to claim 1, wherein either errorless data, correctable error data, or uncorrectable error data is optionally recorded in said data block.

5. The method according to claim 1, comprising the step of acquiring, for said designated logical block address, physical address of said data block prior to reassign block processing, and physical address of said reassign block after reassign block processing.

6. The method according to claim 1, further comprising the step of formatting a recording medium after reassign block processing time determination test.

7. The method according to claim 1, comprising the step of acquiring information relating to said storage device.

8. The method according to claim 7, wherein the information relating to said storage device includes the distribution of the available area in the storage device, the number of reassign blocks, and the number of logical block addresses.

9. A computer-readable recording medium for storing a program for implementing, on a computer, reassign block processing time determination test for a storage device containing data area and available area, said program comprising the steps of:

acquiring time for reassign-block processing data recorded in a data block in said data area corresponding to a designated logical block address to a reassign block in said available area; and comparing said acquired reassign block processing time with a prescribed time.

10. The computer-readable recording medium according claim 9, the program stored on the recording medium further comprising the step of designating a plurality of logical block addresses, wherein reassign block processing is sequentially performed on said data blocks corresponding respectively to said designated plurality of logical block addresses.

11. The computer-readable recording medium according claim 9, wherein the program stored on the recording medium terminates the reassign block processing time determination test when all reassign blocks in the available area have been used prior to completion of reassign block processing on a data block corresponding to a designated logical block address.

12. The computer-readable recording medium according to claim 9, the program stored on the recording medium further comprising the step of optionally recording either errorless data, correctable error data, or uncorrectable error data in said data block.

13. The computer-readable recording medium according to claim 9, the program stored on the recording medium further comprising the step of acquiring, for said designated logical block address, physical address of said data block prior to reassign block processing, and physical address of said reassign block after reassign block processing.

14. The computer-readable recording medium according to claim 9, the program stored on the recording medium further comprising the step of formatting a recording medium after reassign block processing time determination test.

15. The computer-readable recording medium according to claim 9, the program stored on the recording medium further comprising the step of acquiring information relating of to said storage device.

* * * * *

UNITED STATES PATENT AND TRADEMARK OFFICE
CERTIFICATE OF CORRECTION

PATENT NO.    : 6,229,743 B1
DATED         : May 8, 2001
INVENTOR(S)   : Noboru Matsumoto It is certified that error appears in the above-identified patent and that said Letters Patent is hereby corrected as shown below:

Title page,
Line 3, Item [54], Title, change "DEVICE" to -- DEVICES --.
Item [30], Foreign Application Priority Data,
 Change "Feb. 9, 1999" to -- Sept. 2, 1999 --.

Signed and Sealed this

Thirteenth Day of November, 2001

Attest:

NICHOLAS P. GODICI
Attesting Officer   Acting Director of the United States Patent and Trademark Office